(12) United States Patent
Sanchez

(10) Patent No.: US 7,242,939 B2
(45) Date of Patent: Jul. 10, 2007

(54) METHOD OF OPTIMIZING PERFORMANCE OF MOBILE TERMINAL

(75) Inventor: Javier Sanchez, Rueil-Malmaison (FR)

(73) Assignee: NEC Corporation, Tokyo (JP)

( * ) Notice: Subject to any disclaimer, the term of this patent is extended or adjusted under 35 U.S.C. 154(b) by 212 days.

(21) Appl. No.: 10/760,537

(22) Filed: Jan. 21, 2004

(65) Prior Publication Data

US 2004/0152465 A1 Aug. 5, 2004

(30) Foreign Application Priority Data

Jan. 22, 2003 (FR) .................................. 03 00657

(51) Int. Cl.
*H04Q 7/20* (2006.01)
*H04B 7/00* (2006.01)
(52) U.S. Cl. .................................... 455/441; 455/238.1
(58) Field of Classification Search ................ 455/441, 455/238.1
See application file for complete search history.

(56) References Cited

U.S. PATENT DOCUMENTS 6,032,050 A 2/2000 Hasegawa
6,208,861 B1* 3/2001 Suzuki ........................ 455/441
6,490,460 B1* 12/2002 Soliman ...................... 455/522
6,512,935 B1* 1/2003 Redi ........................... 455/574
6,542,471 B1* 4/2003 Ito .............................. 370/252
6,668,172 B1* 12/2003 Yoshimura .................. 455/441
6,738,412 B1* 5/2004 Hayakawa .................. 375/130
2001/0044315 A1* 11/2001 Aoki et al. .................. 455/524

FOREIGN PATENT DOCUMENTS

DE 198 43 664 4/1999
WO WO 01/73959 10/2001

OTHER PUBLICATIONS

European Search Report dated Apr. 1, 2004.

* cited by examiner

*Primary Examiner*—Barry Taylor
(74) *Attorney, Agent, or Firm*—Whitham, Curtis, Christofferson & Cook, P.C.

(57) ABSTRACT

The method of optimizing performance of a mobile terminal comprising a radio communication module, a central computing unit and a plurality of data processing software components which optimizes the operation performance of the mobile terminal comprises the steps of capturing the traveling speed of the terminal from an external source, and distributing the captured speed to each of the data processing software components.

5 Claims, 2 Drawing Sheets

METHOD OF OPTIMIZING PERFORMANCE OF MOBILE TERMINAL

BACKGROUND OF THE INVENTION

1. Field of the Invention

The present invention is in the field of telecommunications, and more specifically it relates to a method of optimizing the performance of a mobile terminal comprising a radio communication module, a central computing unit and a plurality of data processing software components. The present invention also relates to a mobile terminal.

2. Description of the Related Art

To prepare for possible handovers in a mobile telecommunication network, a mobile unit (UE; user equipment) in communication has to identify neighboring cells. For this, the mobile applies a procedure of searching for cells that comprises the step of performing measurements on neighboring cells, which allows for switching to the cell that offers an optimal communication quality. In searching for cells, a major problem arises when the sampling clock of the mobile is imprecise and/or when there is a Doppler deviation between the base station with which the mobile is in communication and the cell the mobile should identify.

A method for solving this problem is described in French patent application No. 02 07617 filed by the present applicant on Jun. 20, 2002. The solution proposed in the above application includes the step of applying digital filtering to the measurement samples collected in a plurality of time windows so as to give a predominant weight to the measurements performed in the most recent time windows. It should be noted that this solution does not take into account the traveling speed of the mobile terminal in the cellular network.

Moreover, detection performance of mobile terminals in a cellular network is highly dependent on the channel propagation properties. Degradation of the information carried by a transmitted signal in terms of amplitude, phase and/or frequency may be caused by these properties. This results in an increase in bit error rate (BER) and deterioration of global service quality offered.

To correct this degradation, a technique known in the prior art comprises the steps of estimating the impulse response (CIR: Channel Impulse Response) of the propagation channel and applying to the received signal a correction calculated according to the estimation. The precision of this estimation significantly varies according to the traveling speed of the terminal. To improve the precision, a known technique comprises the step of applying particular digital filtering, such as for example the filtering based on the technique called WMSA (Weighted Multi-slot Averaging) described in the document by H. Andoh, M. Sawahashi and F. Adachi, "Channel estimation filter using time-multiplexed pilot channel for coherent RAKE combining in DS-CDMA mobile radio," IEICE Trans. Commun., Vol. E81-B, No. 7, July 1998.

A disadvantage of this method comes from the fact that to calculate the coefficients of the digital filter, it is necessary to know a priori the dynamic properties of the channel that are directly related to the traveling speed of the terminal.

Furthermore, studies made public specifically in the document by H. Holma and A. Toskala, "WCDMA for UMTS," Wiley & Sons, 2000 shows that closed-loop power control is ineffective for speeds over 100 Km/h. It is also futile to send power control commands to the base station when this speed is surpassed.

A first solution to this problem would consist of completely stopping the transmission of these commands. However, this is not now allowed by current technical specifications.

SUMMARY OF THE INVENTION

An object of the present invention is to propose a simple method allowing for simultaneous improvement in performance of hardware resources and software resources of a mobile terminal, providing the terminal with a parameter representing usage conditions of the terminal.

The present invention proposes a method of optimizing performance of a mobile terminal which comprises a radio communication module, a central computing unit and a plurality of data processing software components.

The method according to the present invention comprises the steps of: capturing the traveling speed of the terminal from an external source; and distributing the captured speed to each of the data processing software components.

Preferably, the captured traveling speed is distributed according to the nature of processing of each software component and the value of the traveling speed.

In a first embodiment, capturing of the traveling speed is performed manually.

In a second embodiment, the traveling speed is detected automatically in real time by the terminal.

The present invention applies to a mobile terminal comprising a radio communication module, a central computing unit, a cell search algorithm, a closed-loop power control algorithm and an algorithm for deactivating transmission diversity in order to save energy.

The mobile terminal according to the present invention further comprises a communication interface designed to capture the traveling speed of the terminal from an external source and a command module designed to distribute the captured speed to each of the software components of the algorithms.

In a first embodiment, the communication interface comprises a module for automatically capturing the traveling speed of the terminal in real time.

In a second embodiment, the communication interface comprises means for wirelessly receiving the traveling speed of the terminal.

In the third embodiment, the terminal comprises means for transmitting to a base station of a telecommunication network a specific message comprising the traveling speed.

The base station comprises a channel estimation algorithm, a multipath search algorithm and a power control algorithm capable of exploiting the traveling speed sent to the station by the terminal to improve reception performance at the level of the base station and at the level of the mobile as well.

In the present invention, since the traveling speed of the mobile terminal is captured and distributed to a data processing software component of each algorithm, each algorithm can know the traveling speed of the terminal and perform the process based on the traveling speed. The simultaneous improvement in performance of hardware resources and software resources of a mobile terminal is thus achieved.

Other features and advantages of the invention will be apparent from the description below, taken by way of no limiting example, with reference to the single accompanying figure illustrating the main steps of the method according to the invention.

DETAILED DESCRIPTION OF THE INVENTION:

The following description relates to improvement in detection performance of a mobile terminal in a GSM/UMTS (Global System for Mobile communication/Universal Mobile Telecommunications System) telecommunication network.

The idea of the invention is to provide the terminal with a priori information regarding the environment in which the terminal is used so as to parameterize the signal processing algorithms according to the environment.

Figure 1:
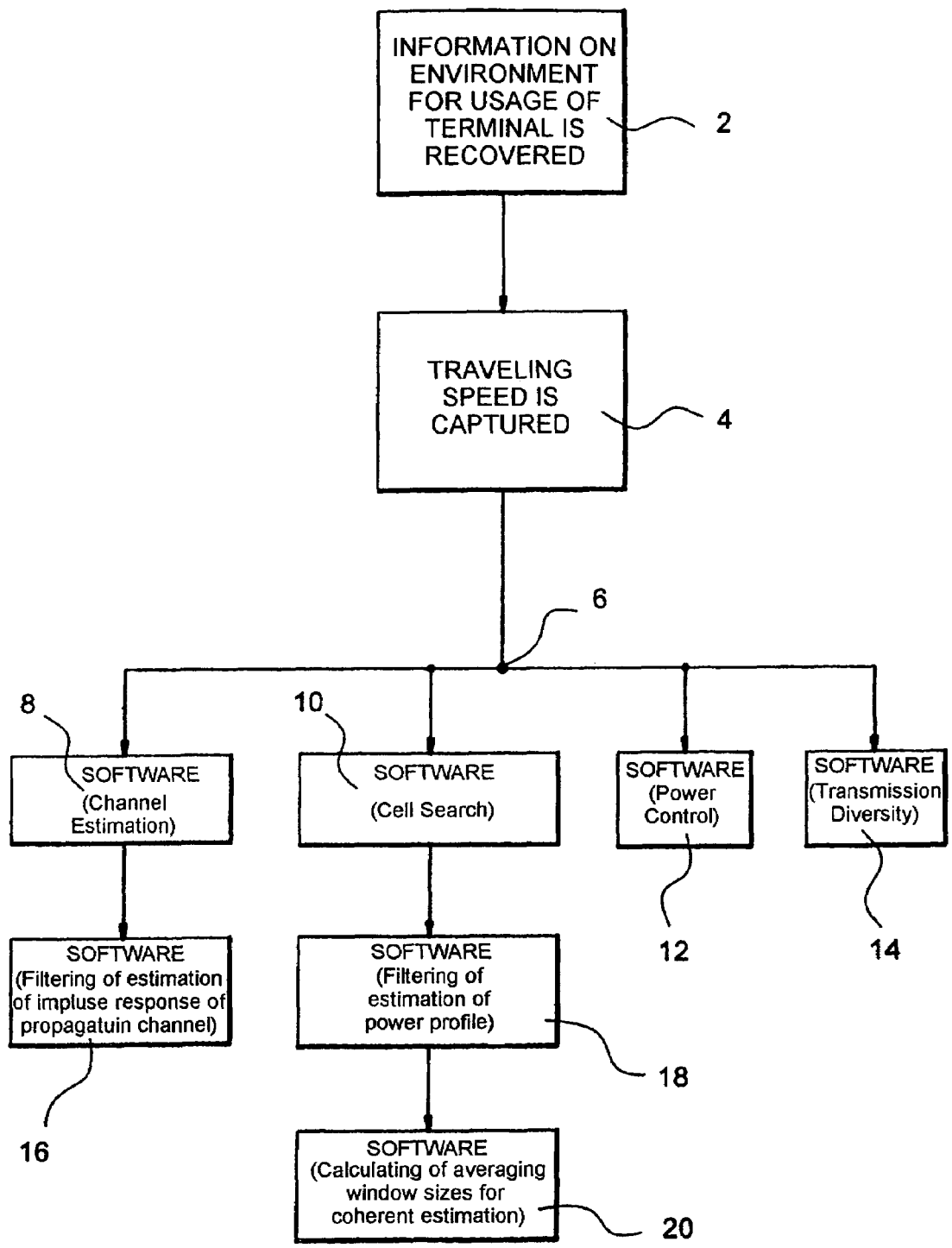
FIG. 1 is a flow chart illustrating the main steps of the method according to the present invention.

FIG. 1 illustrate the main steps of the method according to the present invention. Referring to FIG. 1, information on the environment for usage of the terminal is recovered from an external source in the first step 2.

For this, the mobile terminal comprises an interface that allows the user to select their traveling speed on a display screen and validate the selection manually. Thus, when the user is stationary, the captured speed is zero.

When the user travels on foot with his or her terminal, the speed that is automatically captured or detected is represented on the display screen by an icon corresponding to a speed within a range of 3 Km/h to 10 Km/h.

When the terminal is used in a car, the captured speed may be represented by a plurality of icons, each corresponding to an interval of speeds varying in steps of 10 Km/h for example.

When the terminal is used in a train, the captured speed is represented by a plurality of icons, each corresponding to an interval of speeds varying in steps of 50 Km/h for example.

In a variant embodiment, the speed is automatically detected by the terminal. This embodiment is particularly adapted to the case where the terminal is used in a moving car or train.

In the former case, the terminal is equipped with a hands-free kit and a connector attached to a connecting socket provided for this purpose in the vehicle in order to recover directly and in real time the speed at which the car and mobile travel.

In the latter case, the information may be broadcast in the train by using the Bluetooth or Wi-Fi technology.

Therefore, the terminal is equipped with hardware components necessary for supporting one of these technologies, and also with a program that periodically executes the search for information broadcast in the train.

The speed is captured or detected in step 4.

The captured speeds are simultaneously distributed in step 6 to the following data processing software components which optimize the operation performance of the mobile terminal:

Channel Estimation 8,
Cell Search 10,
Power Control 12,
Transmission Diversity 14,
Filtering of estimation of the impulse response of the propagation channel 16,
Filtering of estimation of the power profile 18, and
Calculating of averaging window sizes for coherent estimation 20.

Each of the signal processing algorithms of these data processing software components performs its processing based on the traveling speed of the terminal. Here, the captured traveling speed is preferably distributed according to the nature of processing of each software component and the value of the traveling speed.

It should be noted that in the majority of the signal processing algorithms cited above, it is not necessary to know precisely the traveling speed of the terminal.

Figure 2:
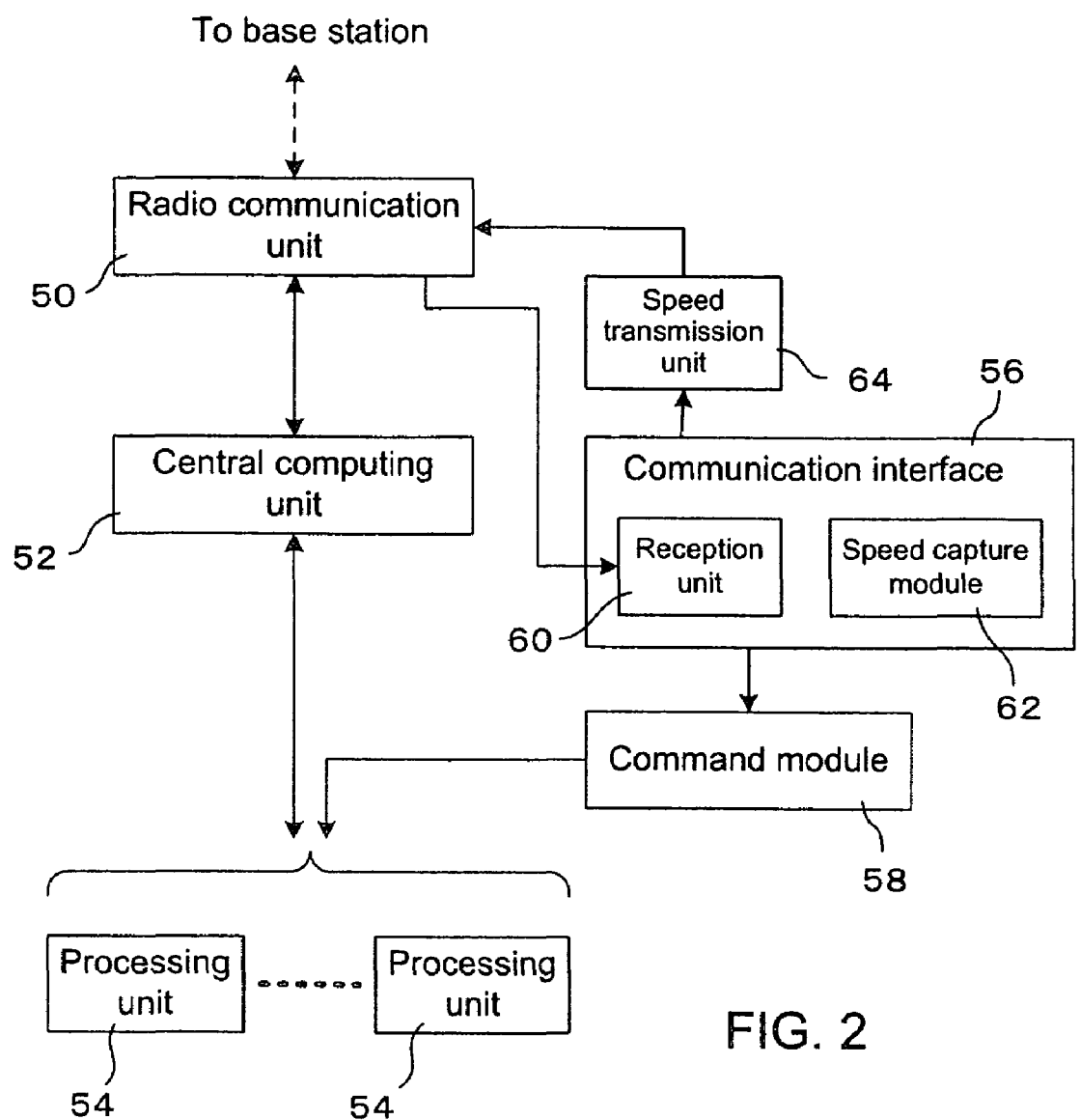
FIG. 2 is a block diagram illustrating the mobile terminal according to an embodiment of the present invention.

FIG. 2 illustrates an example of the constitution of the mobile terminal in the present embodiment. The mobile terminal comprises radio communication module 50 designed for wireless communication with a base station, central computing unit 52, a plurality of processing units 54 each corresponding to a data processing software component designed to optimize the operational performance of the terminal, communication interface 56 designed to capture the traveling speed of the terminal from an external source, and command module 58 designed to distribute the captured speed to each of the data processing software components, that is, to each of processing units 54. Communication interface 56 may be equipped with reception unit 60 designed to wirelessly receive the traveling speed of the terminal. Alternatively, communication interface 56 may be equipped with speed capture module 62 designed to automatically capture in real time the traveling speed of the terminal.

The mobile terminal may include speed transmission unit 64 which transmits the captured traveling speed to a base station of a telecommunication network as a specific message including the traveling speed.

In a telecommunication network in which the mobile terminals according to the present invention are used, the base station preferably comprises a channel estimation algorithm, a multipath search algorithm and a power control algorithm capable of exploiting the traveling speed sent to the station by the terminal to improve reception performance at the level of the base station and at the level of the mobile as well.

What is claimed is:

1. A method of optimizing performance of a mobile terminal comprising a radio communication module, a central computing unit and a plurality of data processing software components designed to optimize operational performance of said mobile terminal by compensating degradation of communication channel properties with motion of said mobile terminal, the method comprising the steps of:

providing traveling speed information from one or more sources external to said mobile terminal, said traveling speed information approximately corresponding to traveling speed of the mobile terminal, said sources external to said mobile terminal including an interface for user input or confirmation of input from other sources and a source communicating over a wired or wireless communication link:

capturing said traveling speed information in the mobile terminal;

distributing the captured traveling speed to each of the data processing software components, said data processing software components including cell search software and channel response estimation software; and controlling communication channel properties by computing communication conditions in accordance with said traveling speed captured in said capturing step.

2. The method according to claim 1, wherein the captured traveling speed is distributed according to a nature of processing of each data processing software component and value of the traveling speed.

3. The method according to claim 1, wherein the traveling speed is detected automatically in real time by the mobile terminal.

4. A mobile terminal comprising:
a radio communication module,
a central computing unit,
a plurality of data processing software components including cell search software and channel response estimation software, each of said data processing software components being designed to optimize a respective aspect of operational performance of said mobile terminal,
a communication interface designed to capture traveling speed information approximating a traveling speed of the mobile terminal, said traveling speed information being provided from an external source said communication interface including a speed capture module capable of receiving said traveling speed information through a wired or wireless link and receiving user input or confirmation of traveling speed information; and
a command module designed to distribute the captured traveling speed to each of the data processing software components whereby each of said data processing software components compensates degradation of a communication channel due to speed of said mobile terminal.

5. The mobile terminal according to claim 4, further comprising
means for transmitting the captured traveling speed to a base station.

* * * * *